INVENTOR
Fritz O. Seger
BY
HIS ATTORNEYS

INVENTOR.
Fritz O. Seger.
BY
HIS ATTORNEYS

United States Patent Office 3,521,659
Patented July 28, 1970

---

3,521,659
HIGH TEMPERATURE VALVE FOR THROTTLING OR THREE-WAY APPLICATION
Fritz O. Seger, Fairview, Pa., assignor to Blaw-Knox Company, Pittsburgh, Pa., a corporation of Delaware
Filed May 18, 1967, Ser. No. 639,357
Int. Cl. G05d 11/03; F16k 15/14
U.S. Cl. 137—112
7 Claims

ABSTRACT OF THE DISCLOSURE

The valve includes a valve member movable toward and away from a seat within the valve. A sealing member is pivotally mounted on the valve member or support. The pivot mounting is relatively loose so that the sealing member can be canted relative to the support. The sealing member thus is self-alignable relative to the valve seat as the support moves the sealing member into engagement with the valve seat. The valve can be adapted for three-way operation by providing a sealing member on opposite faces of the support. In one arrangement the sealing members are joined adjacent opposite ends of a pin passing loosely through an aperture in the support. In either case the support can be provided with a convex back-up surface adjacent the sealing member or members, which are desirably provided in the form of a discoidal spring. In those applications where the valve is opened against a positive $\Delta P$, i.e., a pressure tending to force the sealing member toward its closed position, a relatively rigid, auxiliary back-up member is mounted on the downstream side of the sealing disc to strip the sealing disc from the valve seat to avoid rupturing the sealing disc at its pivotal support.

---

The present invention relates to valve structures which can be used in a variety of environments including high-temperature applications, for example in the neighborhood of 1600° F., and more particularly to a valve of the character described having a diaphragm type closure with means associated therewith to prevent excessive flexing of the diaphragm and to align the diaphragm with the valve seat. In the specific embodiments of the invention as shown, the valve structure is of the flapper type which can be used either for throttling or for three-way operation as will be evident hereinafter.

There are many existing valve constructions utilizing metal-to-metal contact between a valve member and valve seat forming part of the valve constructions. If the valve parts are subjected to elevated temperatures, warpage frequently results in one or both of the mating valve parts which usually results in serious leakage. Such leakage is aggravated when fluids at high pressure are flowed through the valve. Often the leakage scores either or both of the valve seat and valve member before the leak is discovered and repaired. Under these conditions, tendencies to warpage cannot be compensated by employment of an elastic gasket material such as an elastomeric or other plastic material, since they would be destroyed by the elevated temperatures. In extreme cases of such leakage in valve constructions utilizing metal-to-metal contact, one or both of the valve seat and valve element are eroded beyond repair before the leak is discovered.

Previous attempts to solve these problems involve the use of a relatively thin, resilient disc mounted on the valve member for sealing engagement with the valve seat upon relative movement therebetween. One such arrangement is illustrated in Van Camp Pat. No. 2,893,685 which uses a relatively thin resilient valve disc backed up by a relatively rigid member. The disc and backup member are mounted upon a linearly movable valve stem 18 which projects through the annular valve seat. Thus, a stop must be provided to prevent the backup members from being drawn too far within the valve seat. Otherwise, the resilient disc would be distorted beyond its elastic limit. The backup member is provided with a shallow groove into which the resilient disc is deflected when the valve is fully closed. There is no assurance that the disc will assume the shaped appearance indicated by the groove. The resilient disc is rigidly secured to the backup member and, therefore, cannot readily deflect to align itself with the plane of the valve seat opening. Inasmuch as considerable flexure in the resilient disc occurs at its fastener, it is apparent that the Van Camp disc would rapidly fail in use.

A three-way resilient disc type valve is shown in the Pottmeyer Pat. No. 2,767,738 which utilizes a pair of spaced valve discs mounted upon a suitable operating arm for respective engagement with one or the other of the valve seats usually provided in a three-way valve. In the Pottmeyer arrangement, the valve discs are spacedly but rigidly joined in a number of locations but are movably mounted on the aforesaid operating arm. The range of movement, however, is rather limited and likewise the self-adjusting feature of the Pottmeyer patent. Moreover, a rather large number of parts are required to assemble the Pottmeyer valve. No adequate means are provided in the Pottmeyer arrangement for backing up the resilient valve member discs to prevent undue flexure thereof.

I overcome these difficulties of the prior art by providing a simplified yet sturdy and reliable valve structure which can be employed at extremely high temperatures. My novel valve construction utilizes a flapper type valve member, although not limited thereto, with a resilient member or discoidal spring loosely and pivotally mounted thereon. The flapper member is provided with a surface disposed adjacent the diaphragm and is sufficiently rigid to serve as an efficient back-up member for the diaphragm. Desirably, the back-up member is shaped so that when the diaphragm is flexed thereagainst, the diaphragm will not exceed its elastic limit. Desirably also, the diaphragm is pivotally mounted on the flapper by means of a single fastener loosely inserted therethrough. Accordingly, the diaphragm is provided with a limited amount of universal movement relative to the flapper in order to ensure contingent contact with the edges of the valve seat irrespective of any warpage which may occur in the valve seat or in the flapper member.

In a three-way valve construction arrangement in accordance with my invention, a second resilient disc or diaphragm is mounted on the other side of the flapper member for engagement with a second valve seat mounted adjacent the other limit of travel of the flapper member. The second valve disc, for example, can be secured to the aforementioned fastener so that both of the valve discs are mounted on the flapper for limited universal movement relative thereto. When so provided with two valve discs, each side of the flapper member is shaped to provide suitable backing for the adjacent disc. In a typical application, the backing surfaces of the flapper are similarly shaped and the first and second valve discs are of the same thinness and flexibility, although this is not necessarily the case depending upon the application of the invention.

I accomplish these desirable results by providing a valve comprising a valve housing having inlet and outlet ports coupled thereto, said housing defining a flow path therethrough between said ports, a valve seat mounted in said housing and extending across said flow path, a sealing member engageable with said valve seat for obstructing said fluid flow, a support for said sealing member mounted for movement toward and away from said valve seat, said sealing member being pivotally mounted on said support for self-alignable engagement with said valve seat. In other arrangements of my novel valve said sealing member is a relatively thin disc sealingly and centrally secured to a pivot pin extending loosely through a central aperture in said support. In a novel three-way adaptation of my valve said valve housing includes a series of three-way ports coupled thereto, a second valve seat is mounted within said housing, said valve seats being juxtaposed respectively in valve-closing relationship to two of the said housing ports, said sealing member support is mounted for movement between valve-closing positions relative to said valve seats respectively, and a second sealing member is pivotally mounted on the opposite side of said support member, said sealing members being disposed to engage said valve seats at said closing positions respectively.

In the foregoing discussion, certain objects, features and advantages of the invention have been set forth. These and other objects, features and advantages of the invention, together with certain structural details thereof, will be elaborated upon as the following description of certain presently preferred embodiments thereof and certain presently preferred methods of practicing the same proceeds.

In the accompanying drawings, I have shown certain presently preferred embodiments of the invention and have illustrated certain presently preferred methods of practicing the same wherein.

Figure 1:
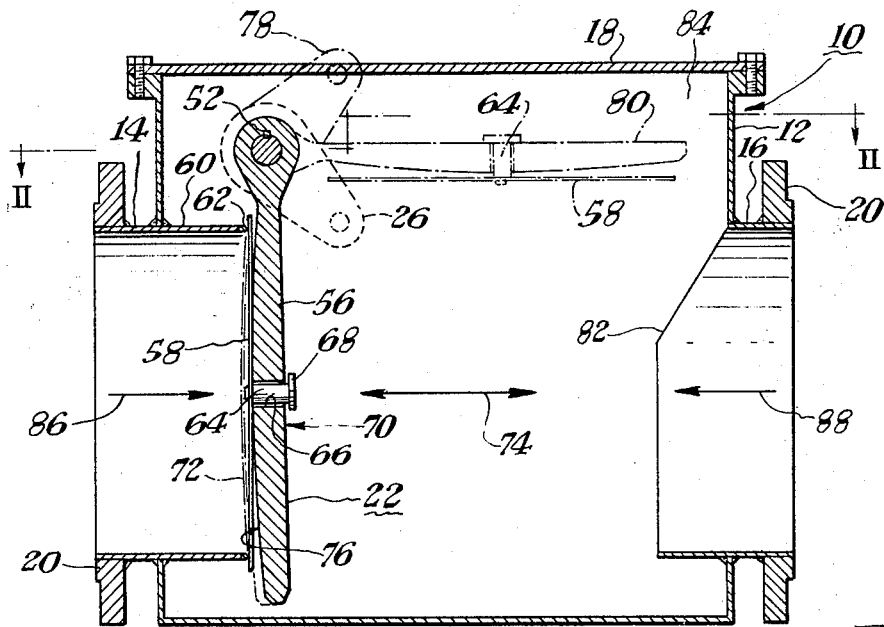
FIG. 1 is a longitudinally sectioned view of one form of valve construction arranged in accordance with the invention.
Figure 2:
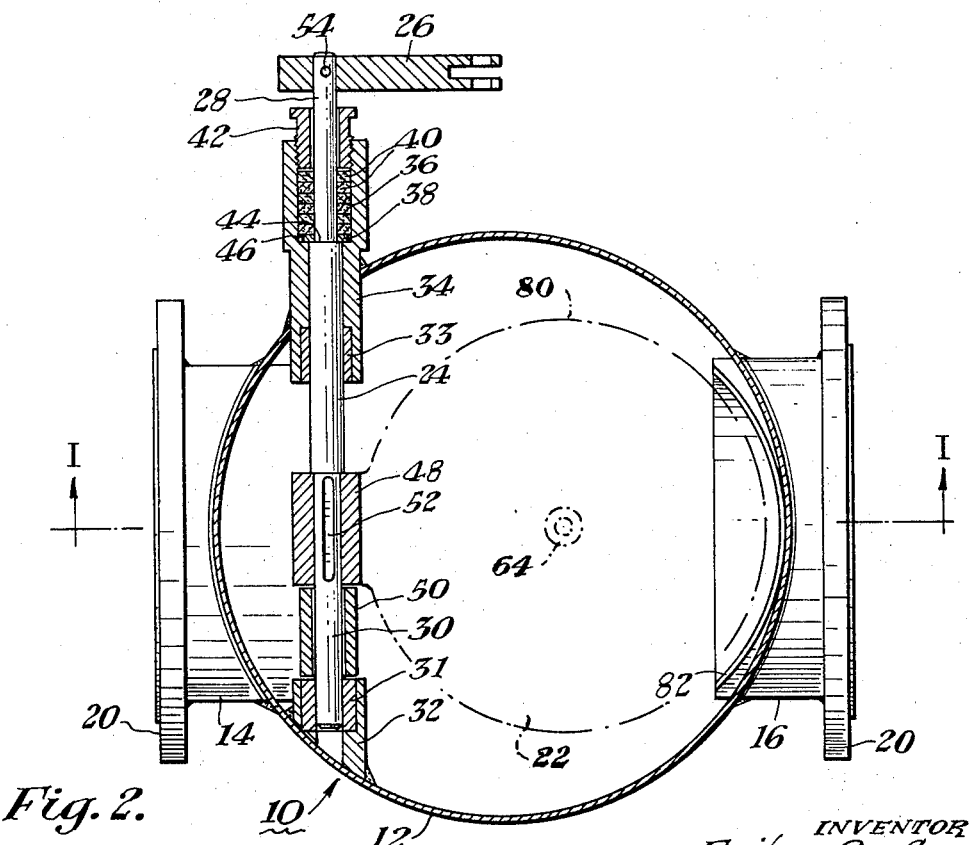
FIG. 2 is another longitudinally sectioned view of the apparatus as shown in FIG. 1 and taken along reference line II—II thereof.

Referring now more particularly to FIGS. 1 and 2 of the drawing, valve construction 10 includes a valve housing 12 to which a pair of inlet and outlet ports 14 and 16 are joined. The upper portion of the housing 12 is closed by an access plate 18 to facilitate replacement or maintenance of the valve mechanism described below. The plate 18 and the adjacent portions of the housing 12 in this example are of circular configuration. Adjacent the outer end of each of the ports 14 and 16 a flange 20 is secured as by welding to enable coupling the valve to other components of the system in which it is used.

The valve mechanism or flapper denoted by reference character 22 is secured to a rotatably mounted shaft 24, one end of which projects from the housing 12 for securance to an operating lever 26. The lever 26 can be operated by any suitable mechanism for example a pneumatic or hydraulic piston and cylinder arrangement (not shown). As better shown in FIG. 2 of the drawings, the lever 26 is secured to journalled outer end portion 28 of the shaft 24. The other journalled end portion 30 of the shaft 24 is inserted into a bearing 31 and bearing support member 32. The support member 32 is secured to the adjacent surface of the housing 12, for example by welding.

A cooperating bearing 33 is mounted in bearing support member 34 which extends through a juxtaposed wall portion of the housing 12 in alignment with the first-mentioned support member 32. In contrast to the support member 32, the member 34 is open at both ends and the shaft 24 extends therethrough. The support member 34 is supplied with an expanded outward opening portion 36 adjacent the outer journalled portion 28 of the shaft to receive a retaining washer 38 and packing denoted generally by the reference character 40. A compression nut 42 is threaded into the tapped outer end of the support member 34 for applying the necessary compression to the packing 40 and to aid in positioning the washer 38 against shoulders 44 and 46 on the drive shaft 24 and the support member 34 respectively in order to restrain outward axial movement of the shaft 24.

The drive shaft 24 is further positioned by supporting collar 48 to which the flapper 22 is secured, and by spacer tube 50 positioned over the shaft 24 between the collar 48 and the adjacent end of the support member 32. The collar 48 is keyed to the shaft 24 by spline 52 for rotation with the shaft 24. Likewise, the operating lever 26 is keyed to the shaft 24 by pin 54.

As better shown in FIG. 1, the flapper 22 comprises supporting disc 56 on which is mounted a relatively thin sealing disc or diaphragm 58. At the closed position of the valve 10, as illustrated by the solid outlines of the flapper 22 in FIG. 1, the sealing diaphragm 58 cooperates with a valve seat 60 which in this example comprises the inner extremity of inlet or outlet port 14. In order to increase the unit sealing pressure, the inward edge of the valve seat 60 can be shaped as a circumferential knife-edge and, to minimize wear, can be fabricated from a separate, complementarily shaped member 62 of Stellite or other suitably hard material.

In order to ensure perfect alignment of the sealing disc 58 with the knife-edge 62 or the like, the sealing diaphragm 58 desirably is loosely mounted on the supporting disc 56. In furtherance of the purpose, the sealing diaphragm 58 is, in this example, centrally and sealingly secured (as by seal-welded) to a headed pin 64 which extends loosely through a central aperture 66 in the supporting disc 56. The aperture 66 is sufficiently larger than the shank portion of the pin 64 as better shown in FIG. 1 to permit the pin 64 to cant slightly within the aperture 66 in order to provide attendant alignment of the sealing diaphragm 58 with the valve seat 60. To prevent interference with the canting action of the pin 64, the head 68 thereof is displaced slightly from the adjacent rear surface 70 of the supporting disc 56 at the closed position of the flapper 22.

It is contemplated that the flapper 22 may be closed against valve seat 60 with sufficient force to bulge the thin sealing diaphragm 58 inwardly of the port 14 as denoted by the chain outline 72 of the diaphragm 58. The forces thus imparted to the diaphragm 58, together with the knife-edge 62 ensures a tight seal between the disc and the port 14, in order to ensure completely shutting off the valve 10 regardless of the pressure and flow direction of fluid through the valve, as denoted by double-headed arrow 74.

To prevent straining the sealing diaphragm 58 beyond its elastic limit, the adjacent surface 76 of the support disc 56 is provided with a convex or spherical surface against which the sealing diaphragm 58 is forced into flush engagement when maximum sealing forces are imparted to the diaphragm 58. At this time, at least the outer peripheral portions of the diaphragm 58 are sandwiched between the adjacent portions of the support 56 and the knife-edge 62 to provide a limiting stop against further movement of the supporting disc 56. The radius of the peripheral surface 76 of the supporting disc 56 is sufficiently large that sealing diaphragm 58 does not exceed its elastic limit when forced into the bulged position 72 thereof. During the initial portions of the bulging movement, after contact between the sealing diaphragm 58 and the knife-edge 62 is established, the sealing diaphragm 58 and its supporting pin 64 can pivot slightly relative to the apertured supporting disc 56 to ensure a symmetrical application of sealing forces about the periphery of the sealing diaphragm 58.

When opening the valve 10, the operating arm 26 is moved from its dashed outline position in FIG. 1 to its chain outline position 78 to angularly displace the shaft 24 and the flapper 22 to its inactive chain-outline position 80. In a specific example of the invention as shown in the drawings, the valve mechanism is displaced 90°. The inner end of the inlet or outlet port 16 is cut away at 82 to provide clearance for the outward end of the flapper 22. In the inactive position of the flapper as shown in FIG. 1, the sealing diaphragm 58 is suspended loosely therefrom by its headed supporting pin 64.

It will be seen from chain outline position 78–80 of the valve mechanism that the flapper 22 is fully withdrawn from the path of fluid of valve 10 and into an upper housing portion 84 provided for this purpose. Thus, all of the operating parts of the valve 10 can be fully withdrawn from the main stream through the valve 10 to provide a full flow valve with no fluid obstruction beyond negligible fluid expansion and contraction losses. Moreover, the rugged construction of the flapper 22 and other moveable valve components including the shaft 24 and the tubular support members 32, 34 therefor endow the valve 10 with a long life of trouble-free operation, even at elevated fluid pressures and temperatures. Finally, the valve mechanism can be readily disassembled for service and maintenance.

It will be readily apparent that the valve 10 can also be employed as a check valve in which case the protruding shaft portions 28 and the operating arm 26 can be eliminated. In the latter arrangement of the invention, the flapper 22, including sealing diaphragm 58, will be held open by fluid flowing through the valve 10 in the direction denoted by arrow 86. On the other hand, when flow through the valve is terminated, the flapper 22 will swing by its own weight toward its closed position and any reverse fluid pressure applied in the direction denoted by arrow 88 will apply corresponding sealing forces to the support 56 and the sealing diaphragm 58 to produce a greater or lesser elastic distortion therein as described previously.

Figure 3:
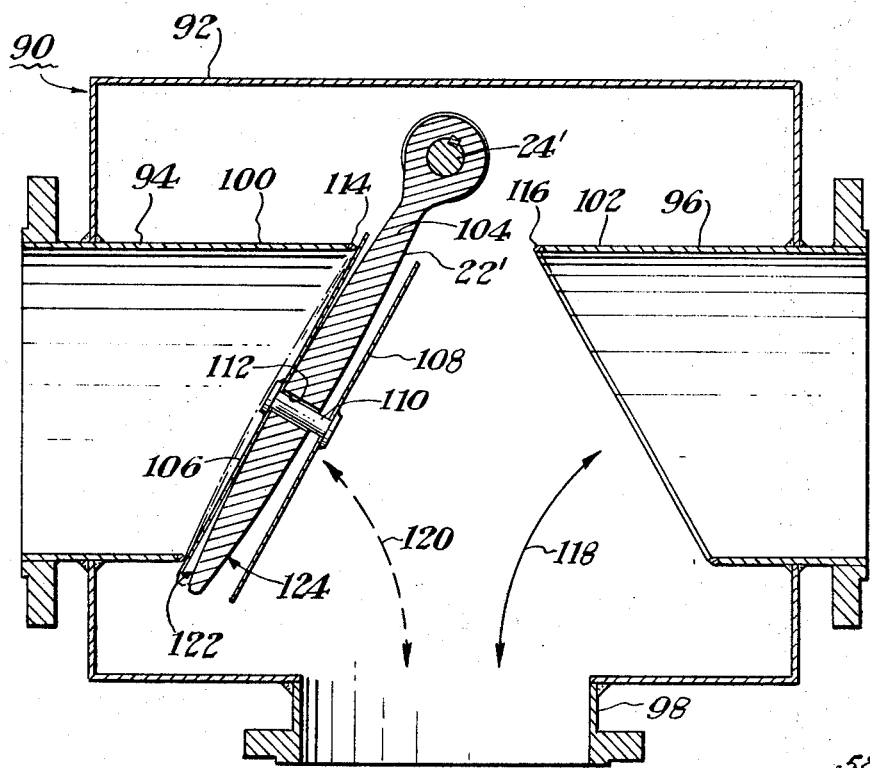
FIG. 3 is a longitudinally sectioned view of another valve construction arranged in accordance with the invention and adapted in this example for three-way application.

Referring now to FIG. 3 of the drawings, the principles of my invention can also be employed in conjunction with a three-way valve 90 including a housing 92 and three-way ports 94, 96 and 98. Two of the ports, for example the ports 94, 96, are each provided with a diagonal valve seat 100 or 102. The angle of inclination of the valve seats 100, 102 conform to the arcuate path delineated by movements of flap member 22' including a support member or disc 104 as it moves between a closed position relative to the valve seat 100 and a second closed position relative to the valve seat 102. The support member 104 is secured to an operating shaft 24' for angular displacement therewith, for example in the manner described previously in connection with FIGS. 1 and 2.

In this arrangement of the invention, the flapper 22' includes a first sealing disc 106 pivotally mounted on one side of the support member 104 for engagement with the valve seat 100 and a second sealing disc 108 pivotally mounted on the other side of support member 104 for sealing engagement with the other valve seat 102. In a specific example of the invention, the sealing discs 106, 108 are pivotally mounted by being rigidly joined to protruding ends respectively of a central connecting pin 110, which in turn is loosely inserted through a central aperture 112 in the support member 104. Thus, the connecting or pivot pin 110 is free to cant slightly within the aperture 112 so that the position of the sealing discs 106 and 108 relative to the respective valve seats 100, 102 will be automatically adjusted for alignment therewith during the final closing movements of the flapper 22'.

As noted previously in connection with FIG. 1 of the drawings, each of the valve seats 100, 102 can be provided with a peripheral knife-edge 114 or 116 respectively to increase the unit and engaging sealing forces between the valve seats 100, 102 and the sealing discs 106, 108 respectively. The knife-edges 114, 116 likewise can be fabricated from Stellite or other suitably hard material, while the discs 106, 108 can be fabricated from a thin structural material, which will maintain its elasticity at the temperature contemplated, so that effective metal-to-metal seals are established between the valve seats 100, 102 and the sealing discs 106, 108 which are, for example, seal-welded to the protruding ends of the pivot pin 110. A suitable, known carbon or alloy steel can be selected for any temperature range which may be encountered. With this arrangement, effective setting and sealing of the flapper 22' against either of the valve seats 100, 102 can be accomplished irrespective of the direction of flow through the valve housing 92 as indicated by double headed arrows 118 and 120.

In order to limit the pressure or distortion of the sealing discs 106, 108 to a configuration well within their elastic limits, the support member 104 is provided with a double-convex configuration. The convex surfaces 122, 124 thus formed desirably exhibit polar symmetry about the pivot pin 110 and are provided with sufficiently long spherical radii (not shown) to serve as flexure stops for the sealing discs 106, 108 respectively. In operation, the support member 104 can be forced against one or the other of the valve seats 100, 102 to tightly sandwich part or all of the periphery of the associated one of the sealing discs 106, 108 between the valve seat and the sealing member 104, depending upon the degree of cant assumed by the sealing disc in aligning itself with the adjacent valve seat.

Figure 4:
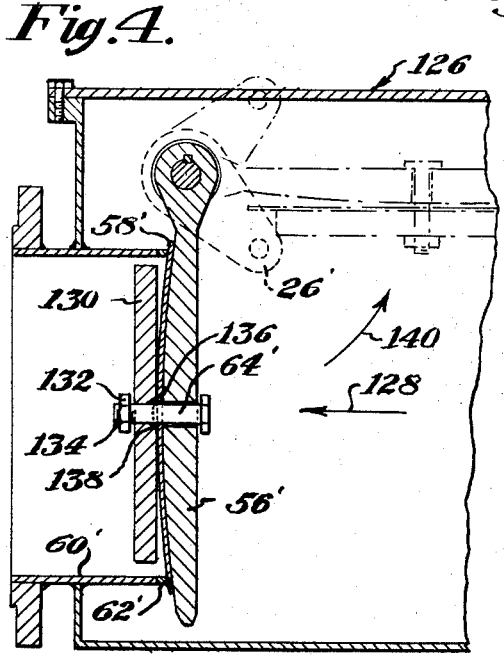
FIG. 4 is a partial longitudinally sectioned view similar to FIG. 1 but showing a modified support arrangement for the sealing disc of the valve construction.

Referring now to FIG. 4 of the drawings, a modified form of the valve construction of FIG. 1 is illustrated therein. Valve 126 of FIG. 4 is particularly adapted for use with a very thin sealing disc 58', which must be opened against a positive ΔP as denoted by arrow 128. In the larger valves even a small ΔP can result in a very considerable force being applied to the junction between the disc 58' and the pivot or mounting pin 64', when the operator 26' is manipulated, to open the valve against a pressure tending to close the valve. In many applications such force would be sufficient to rupture the sealing disc 58' at this junction. I overcome this problem by providing an auxiliary back-up member or disc 130 on an elongated form of the pin 64' where it is secured by nut 132. To prevent loss of the nut 132 the latter can be spot-welded as denoted by reference character 134. In this example the sealing disc 58' is seal-welded at 136 to the pin 64', and to accommodate the weld 136 the back-up member 130 is beveled at its aperture 66' as denoted by reference character 138.

The auxiliary back-up member 130, in this example, is discoidal and is shaped to fit loosely within the valve seat 60' adjacent the knife edge 62'. That surface of the auxiliary back-up member adjacent the sealing disc desirably is planar to minimize flexure of the sealing disc. When the valve is opened as denoted by arrow 140, the auxiliary back-up member 130 engages the major proportion of the adjacent surface of the sealing disc 58', to strip the latter from the valve seat 60'.

Figure 4A:
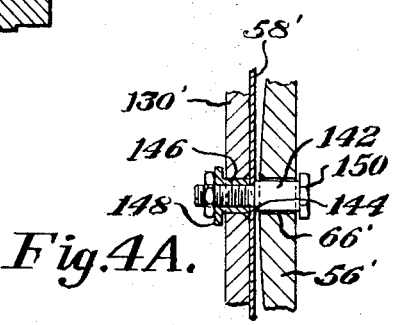
FIG. 4a is a partial longitudinally sectioned view similar to FIG. 4 and illustrating modified means for attaching the sealing disc and the auxiliary back-up member to the pivot mounting.

In FIG. 4a an auxiliary mounting arrangement for the sealing disc 58' and auxiliary back-up member 130 is illustrated. In this example the sealing disc 58' is mounted on a stripper bolt 142, which is inserted loosely through aperture 66' of the valve member 56'. The sealing disc 58' is positioned against the shoulder 144 of the stripper bolt and is retained there by internally threaded bushing 146. Flange 148 of the bushing retains the auxiliary back-up member 130 on the stripper bolt and bushing combination 142–146 in close fitting engagement with the sealing disc 58'. The bushing 146 is sufficiently tightened against the sealing disc 58' and stripper bolt shoulder 144 to provide an effective seal between the stripper bolt 142 and sealing disc 58'. To facilitate tightening the bushing 146, the bushing flange 148 and stripper bolt head 150 can be provided with hex or other wrench configurations.

Figure 5:
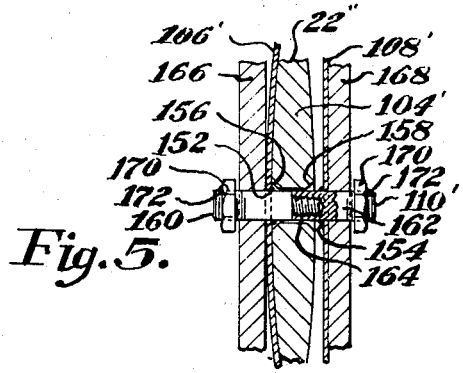
FIG. 5 is a partial longitudinally sectioned view similar to FIG. 3 and illustrating a modified support arrangement for the sealing disc.

With reference to FIG. 5 of the drawings a modified flapper 22'' is disclosed for use in a three-way valve, similar to that shown in FIG. 3 of the drawings. The flapper 22″ is likewise modified for opening relative to either of the valve seats 114, 116 (FIGS. 3 and 5) against a positive ΔP, as explained previously in connection with FIG. 4. Thus, the sealing disc 106′ and 108′ are seal-welded to pivot pin 110′. Desirably, the seal welds 152 and 154 are made inwardly of the sealing disc 106′, 108′ and can seat respectively in notches 156, 158 of the support member 104′. To facilitate welding, pin 110′ can be provided in two parts 160, 162 threadedly engaged at 164. Each of the pin components projects outwardly of the sealing disc 106′ or 108′, and an auxiliary back-up member 166 or 168 is mounted thereon. The back-up members are retained by mounting nuts 170 which are spot-welded or peened at 172 to prevent loosening. Each back-up member 166 or 168 operates in conjunction with its associated sealing disc 106′ or 108′ in the manner discussed above in connection with FIG. 4 and back-up member 130 and sealing disc 58′.

While I have shown and described certain presently preferred embodiments of the invention and have illustrated certain presently preferred methods of practicing the same, it is to be distinctly understood that the invention is not limited thereto but may be otherwise variously embodied and practiced within the scope of the following claims.

I claim:

1. A valve comprising a valve housing having inlet and outlet ports and a valve seat mounted therein in communication with said ports, a valve member mounted within said housing for movement toward and away from said valve seat, said valve member including a relatively thick support and a single relatively thin but resilient metallic sealing disc pivotally and universally mounted on said support on a side thereof adjacent said valve seat, said support having an area at least coextensive with that of said sealing disc, and the surface of said support adjacent said sealing disc being of a shallow convex configuration shaped to permit distortion and preliminary alignment of said pivoted disc with said seat upon initial bearing contact therebetween and then to closely sandwich said sealing disc between said valve seat and at least the adjacent outer peripheral portion of said support within the limits of elastic distortion of said sealing disc.

2. The combination according to claim 1 wherein said valve housing includes a series of three-way ports coupled thereto, a second and similar valve seat is mounted within said housing, said valve seats being juxtaposed respectively in valve-closing relationship to two of the said housing ports, said support is mounted for movement between valve-closing positions relative to said valve seats respectively, and a second and similar metallic sealing disc is similarly pivotally mounted on the opposite side of said support, said sealing discs being disposed to engage said valve seats at said closing positions respectively, the area of said support and the surface of said opposite side being similarly related to said second metallic disc.

3. The combination according to claim 2 wherein said pivot mounting include a pin loosely fitted through a central aperture in said support and protruding therefrom, and said metallic discs are rigidly and sealingly secured to the protruding ends respectively of said pin.

4. The combination according to claim 1 wherein said support has polar symmetry about said pivot, said valve seat has a peripheral knife edge member fabricated from a relatively hard metallic material to provide a metal-to-metal seal of high unit sealing pressure at the closed position of said valve member, the area of said metallic disc juxtaposed to said knife edge being smooth to facilitate distortion of said metallic disc while engaged with said knife edge, said metallic disc being sealingly and centrally secured to a pivot pin extending loosely through a central aperture in said support to form said pivot mounting and to permit at least partial alignment of said metallic disc with the plane of said knife edge upon initial contact therewith.

5. The combination according to claim 1 wherein an auxiliary back-up member is secured to said pivot mounting at the other side of said metallic disc to strip said disc from said valve seat against a positive ΔP, said auxiliary back-up member being shaped for relatively closely fitting insertion through said valve seat and being substantially coextensive with that area of said metallic disc which is circumscribed with said valve seat.

6. A valve comprising a valve housing having inlet and outlet ports and a valve seat mounted therein in communication with one of said ports, a valve member mounted within said housing for moving toward and away from said valve seat, said valve member including a relatively rigid support and a normally flat resilient metallic sealing disc pivotally and universally mounted on said support, the surface of said support adjacent said sealing disc being of shallow convex configuration shaped to closely sandwich said sealing disc between said valve seat and at least the adjacent outer peripheral portion of said support within the limits of elastic distortion of said sealing disc, said support surface being at least coextensive in area relative to that of said disc, and an auxiliary back-up member secured to said pivot mounting at the other side of said sealing disc to strip said sealing disc from said valve seat against a positive ΔP, said auxiliary back-up member being shaped for relatively closely fitting insertion through said valve seat, and being substantially coextensive with that area of said metallic disc which is circumscribed by said valve seat.

7. The combination according to claim 6 wherein said valve housing includes a series of three-way ports coupled thereto, a second and similar valve seat is mounted within said housing, said valve seats being juxtaposed respectively in valve closing relationship to two of said housing ports, said support is mounted for movement between valve-closing positions relative to said valve seats respectively, a second and similar metallic sealing disc is similarly and pivotally mounted on the opposite side of said support, said metallic discs being disposed to engage said valve seats at said closing positions respectively, the area of said support and the surface of said opposite side being similarly related to said second metallic disc, and a pair of auxiliary back-up members secured to said pivot mountings outwardly of said sealing discs respectively and closely engageable with said sealing discs to strip said discs from said valve seat respectively against a positive ΔP, said back-up members being shaped for relatively closely fitting insertion through said valve seats respectively and being substantially coextensive with those areas respectively of said metallic discs which are circumscribed by said valve seats.

References Cited

UNITED STATES PATENTS

| | | | |
|---|---|---|---|
| 1,934,314 | 11/1933 | Lawler | 251—357 |
| 2,767,738 | 10/1956 | Pottmeyer | 137—625.44 |
| 2,893,685 | 7/1959 | Van Camp | 251—334 |
| 1,980,495 | 11/1934 | Muir | 251—86 |
| 2,533,921 | 12/1950 | Dahl | 251—298 |
| 2,850,034 | 9/1958 | Suabeek | 251—333 |
| 3,191,619 | 6/1965 | Allen | 251—86 |

FOREIGN PATENTS 37,958    4/1936    Netherlands.

WILLIAM F. O'DEA, Primary Examiner

H. M. COHN, Assistant Examiner

U.S. Cl. X.R.

137—527.4; 251—334